(12) United States Patent
Hasegawa et al.

(10) Patent No.: US 9,049,726 B2
(45) Date of Patent: Jun. 2, 2015

(54) HETEROGENEOUS-SYSTEMS COEXISTENCE METHOD AND WIRELESS GATEWAY APPARATUS

(71) Applicant: HITACHI KOKUSAI ELECTRIC INC., Tokyo (JP)

(72) Inventors: Keigo Hasegawa, Tokyo (JP); Masayuki Takekawa, Tokyo (JP); Keat Beng Toh, Tokyo (JP); Kei Yanagisawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 90 days.

(21) Appl. No.: 13/766,854

(22) Filed: Feb. 14, 2013

(65) Prior Publication Data

US 2013/0235771 A1    Sep. 12, 2013

(30) Foreign Application Priority Data

Mar. 6, 2012   (JP) .................................. 2012-049064

(51) Int. Cl.
*H04W 74/08* (2009.01)
*H04W 16/14* (2009.01)
*H04W 84/04* (2009.01)

(52) U.S. Cl.
CPC .............. *H04W 74/08* (2013.01); *H04W 16/14* (2013.01); *H04W 84/047* (2013.01)

(58) Field of Classification Search
USPC .......... 370/241, 329, 331, 338, 341; 455/501, 455/509
See application file for complete search history.

(56) References Cited

U.S. PATENT DOCUMENTS

2011/0305206 A1* 12/2011 Junell et al. .................... 370/329
2013/0070605 A1*  3/2013 Ghosh et al. ................... 370/241

FOREIGN PATENT DOCUMENTS

| JP | 2011-176508 | 9/2011 |
| JP | 2011-193422 | 9/2011 |
| JP | 2012-029177 | 2/2012 |

OTHER PUBLICATIONS

IEEE Standards Association, "Part 22: Cognitive Wireless RAN Medium Access Control (MAC) and Physical Layer (PHY) Specifications: Policies and Procedures for Operation in the TV Bands", IEEE Std 802.22—2011, Institute of Electrical and Electronics Engineers, Inc., New York, NY, Jul. 1, 2011.
Tuncer Baykas, "Workshop on TV White Space Coexistence: IEEE 802.19.1 Overview" [online], [retrieved on Feb. 18, 2012], retrieved from http://ieee802.org/19/pub/Workshop/2_Baykas-NICT.pdf.

* cited by examiner

*Primary Examiner* — Awet Haile
(74) *Attorney, Agent, or Firm* — Harness, Dickey & Pierce, P.L.C.

(57) ABSTRACT

A network management unit included in a base station of WRAN, and a heterogeneous-systems coexistence function unit included in a relay station perform communications by taking advantage of the wireless line of WRAN. In this way, the network management unit and the heterogeneous-systems coexistence function unit make the determination and management of a frequency channel to be utilized by WLAN. Concretely, the QP (Quiet Period) of WRAN and that of WLAN are synchronized with each other with respect to the above-described frequency channel. During the synchronized QPs, WRAN and WLAN make the absence confirmation of a primary user.

8 Claims, 5 Drawing Sheets

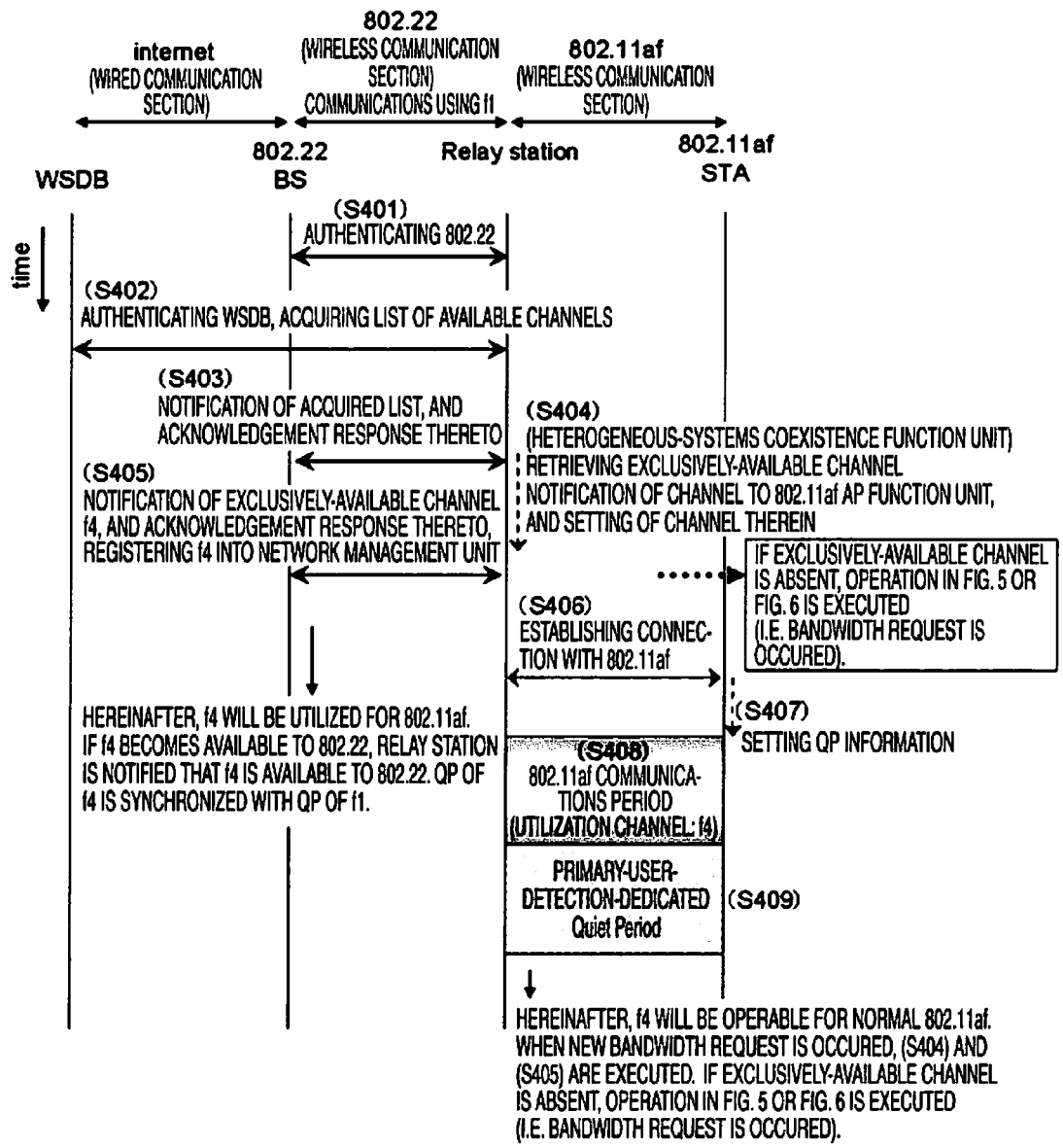

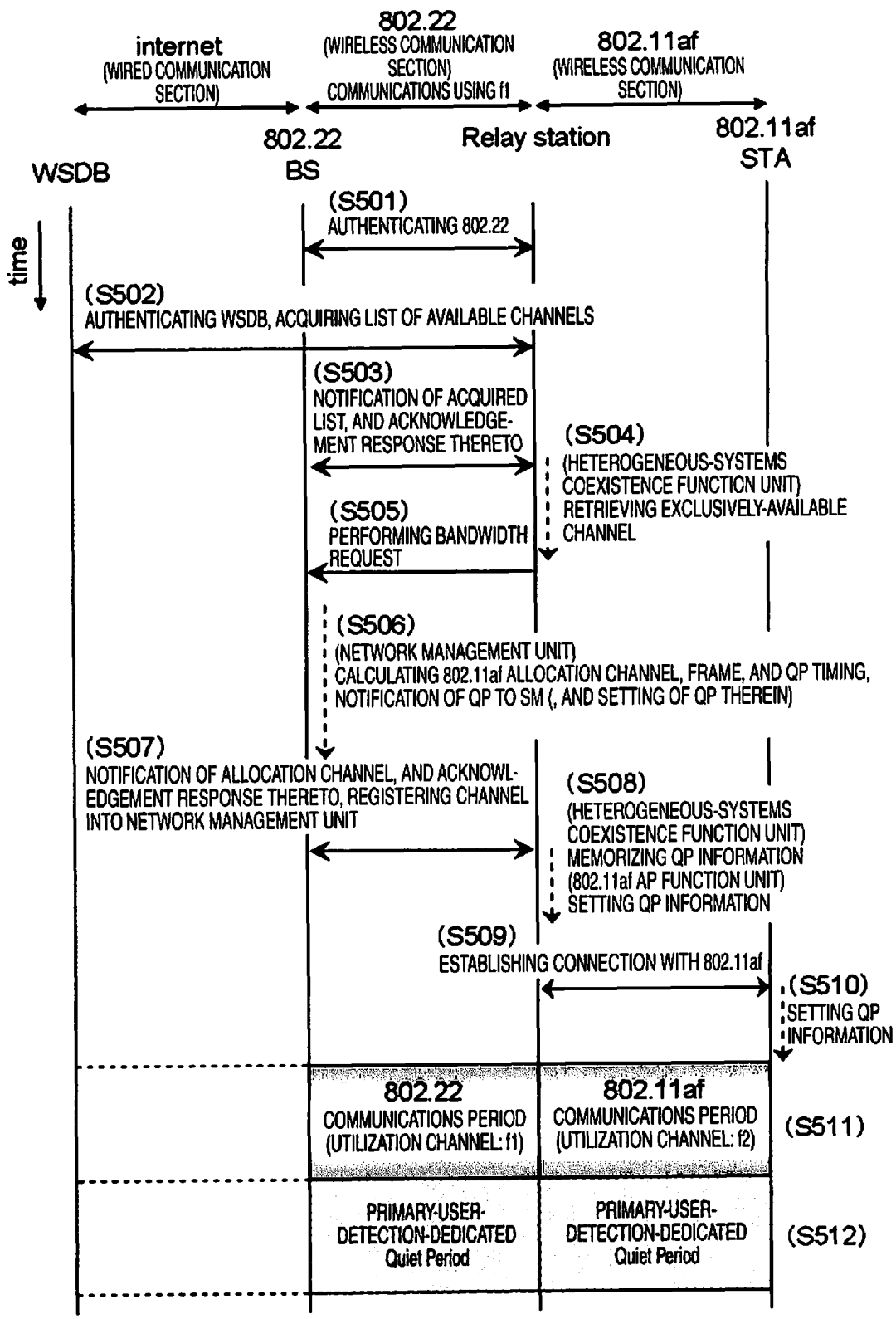

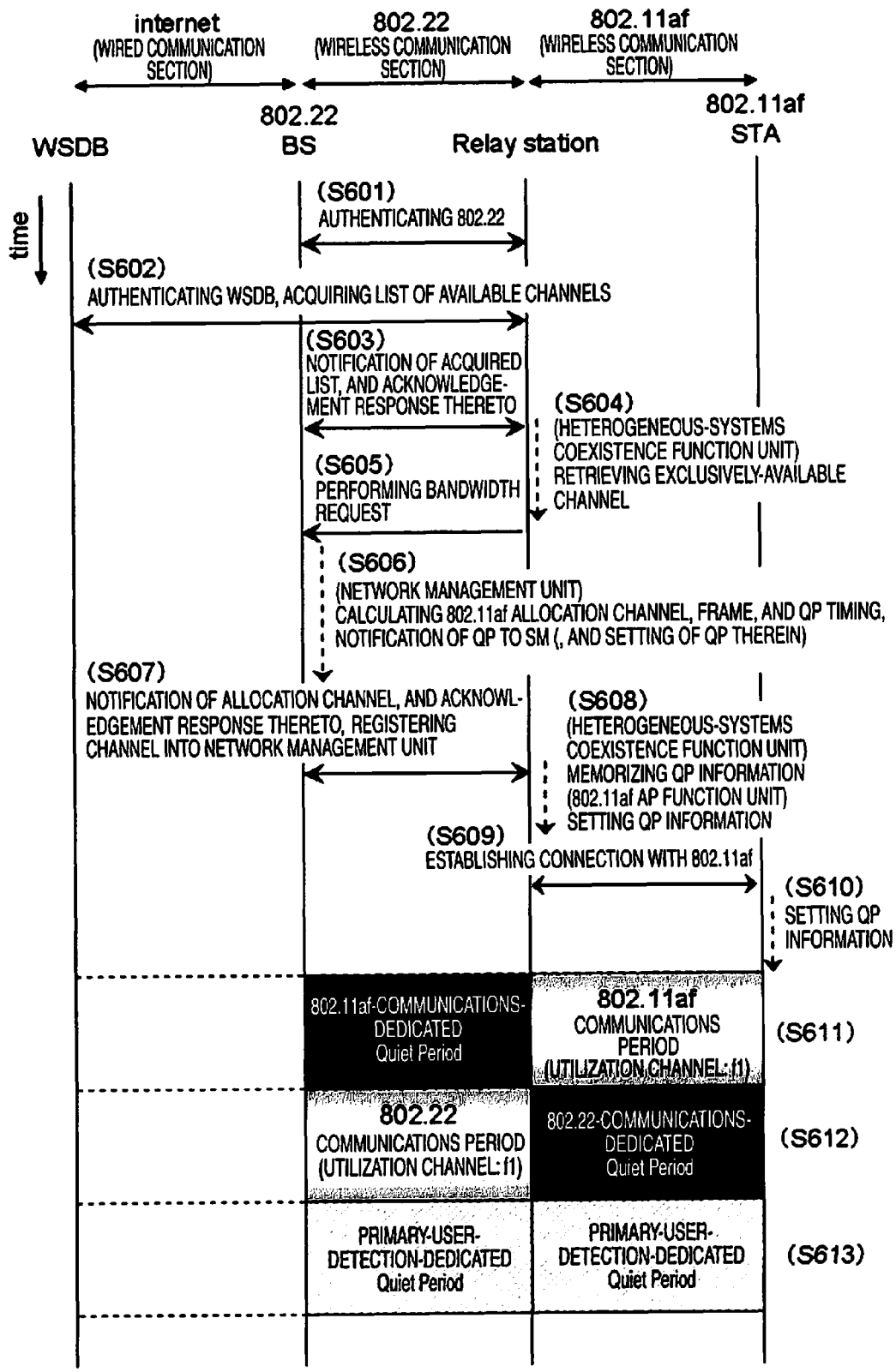

HETEROGENEOUS-SYSTEMS COEXISTENCE METHOD AND WIRELESS GATEWAY APPARATUS

INCORPORATION BY REFERENCE

The present application claims priority from Japanese applications No. JP2012-049064 filed on Mar. 6, 2012, the content of which is hereby incorporated by reference into this application.

BACKGROUND OF THE INVENTION

The present invention relates to a heterogeneous-systems coexistence method and a wireless gateway apparatus for allowing the utilization of one and the same frequency in a plurality of different white-spaces-utilized wireless communications systems. Here, each of these white-spaces-utilized wireless communications systems flexibly utilizes radio waves included within the white spaces, while sufficiently avoiding influences that are exerted onto already-existing operations (i.e., primary system, primary users, and primary-use system).

In recent years, as a novel frequency-utilizing method for solving the frequency's exhaustion problem, researches and developments have been made concerning the following white-spaces-utilized wireless communications system such as a cognitive-radio communications system: Namely, this white-spaces-utilized wireless communications system flexibly utilizes the radio waves included within the frequency bands (i.e., white spaces), while sufficiently avoiding the influences exerted onto the already-existing operations. Here, the white spaces are the frequency bands that are still available in time and space, although the bands have been pre-allocated already.

For example, the standardizations of this white-spaces-utilized wireless communications system are now underway in the IEEE802.22 (refer to Non-Patent Document 1) and the IEEE802.11af. In these standards, in order to avoid the influences exerted onto the already-existing operations (such as, e.g., TV broadcasting), the following requirements are specified:

1) Each wireless station makes an access to a white-spaces-managing database (i.e., Incumbent DB, white-space database, WSDB) on the IP network, or a network manager thereon. By making this access, each wireless station acquires an available frequency list and transmittable maximum power which are based on its own geolocation information, and 2) each wireless station performs its communications after making the following confirmation by using its spectrum-sensing function (i.e., signal-detecting function): Namely, it is confirmed that an already-existing station, which is using a frequency that is to be utilized by each wireless station, does not exist in its surroundings.

In order to effectively perform these acquisition and confirmation, consideration is now given to an idea that the bandwidth and channel deployment of each standard be made identical to those of the TV broadcasting.

By the way, the above-described respective standards differ from each other in their services that are targeted thereby. Namely, in the IEEE802.22, its object is to construct the WRAN (Wireless Regional Area Network) for covering a wide-scale area by using a long-distance wireless transmission. Meanwhile, in the IEEE802.11af, its object is to construct the WMAN (Wireless Metropolitan Area Network) for covering an intermediate-scale area, and the WLAN (Wireless Local Area Network) for covering a narrow-scale area by using an intermediate-or-short-distance wireless transmission. In these systems, consideration is now given to the following method, for example: Namely, the IEEE802.22 WRAN i.e., the long-distance wireless transmission facility, is used as a backhaul line for implementing the Internet connection; whereas the IEEE802.11af WLAN is used as the intermediate-or-short-distance wireless transmission facility for covering each intra-home or intra-city area. Accordingly, it is requested to devise and provide a control for allowing the two wireless networks of the IEEE802.22 and the IEEE802.11af to coexist with each other without interfering with each other (refer to, e.g., JP-A-2012-29177, JP-A-2011-193422, and JP-A-2011-176508, and Non-Patent Document 2).

[Non-Patent Document 1] Edited by the Institute of Electrical and Electronics Engineers (IEEE) Computer Society, "IEEE Std 802.22.2011 Part 22: Cognitive Wireless RAN Medium Access Control (MAC) and Physical Layer (PHY) Specifications: Policies and Procedures for Operation in the TV Bands", (United States), IEEE Standardization Association, Jul. 27, 2011

[Non-Patent Document 2] Tuncer Baykas, "IEEE802.19.1 Overview", [online], IEEE802.19 Working Group

SUMMARY OF THE INVENTION

For example, consideration is now given to a case where, when the frequencies that are available within the white spaces are one and only frequency, the IEEE802.11af WLAN system exists inside the service area of the IEEE802.22 WRAN system. In a case like this, the following problems are conceivable:

(1) Each wireless station of the IEEE802.22 system and that of the IEEE802.11af system are not equipped with a reception function for receiving communications from the other systems to each other. Accordingly, the wireless stations cannot distinguish whether the other systems are primary users, or a still other white-spaces-utilized system (i.e., secondary users), although the wireless stations can detect existences of the other systems to each other by using their frequency-sensing functions. In a case like this, both of the wireless stations judge that the one and only frequency is an unavailable frequency, despite the fact that it is the available frequency actually. As a result, the two systems fall into communications-incapable states.

(2) Even if the two systems have found it successful to recognize the mutual systems by using signal-processing techniques such as feature detection, there exists none of the protocols for allowing the two systems to coexist with each other. As a result, the two systems find it impossible to share and co-use the one and only frequency. The reasons for this impossibility are as follows: Namely, the IEEE802.22 system, whose access scheme is the OFDMA/TDD, performs the transmission of radio waves periodically. Meanwhile, the access scheme of the IEEE802.11af system is the CSMA/CA (Carrier Sense Multiple Access with Collision Avoidance), whereby the transmission of radio waves is performed after emptiness of the frequency bandwidth of the radio waves has been confirmed immediately before the transmission. Accordingly, the IEEE802.11af system can perform its communications only during an exceedingly short time-period during which the IEEE802.22 system performs none of its communications. Consequently, an unfair partiality is caused to occur in the utilization of the frequency bands. Also, the time-period during which the IEEE802.22 system performs none of its communications is not necessarily a time-period that is made available by the IEEE802.11af system. Namely, in some cases, the time-period is a time-period (i.e., Quiet Period: QP) for sensing a primary user, or a switching time-period for making a switching between the upstream and downstream lines. If the IEEE802.11af system starts its transmission during this time-period, the following problems occur: Namely, the IEEE802.22 system accidentally commits false alarm or miss-detection of the primary user, or undergoes interference during a data transmission/reception time-period (i.e., upstream/downstream frame).

Also, as another problem, the following situation is conceivable: Namely, when providing a broadband line to each home positioned in the suburbs or a remote place, the broadband line is provided not by installing a wired network such as FTTH (Fiber To The Home), but by constructing a wireless network. In a case like this, the method that is conceivable as a solution thereto is as follows: Namely, the mutual connection with the different wireless network, or the multi-hop transmission is implemented in such a manner that the long-distance wireless transmission facility as the backhaul line, and the intermediate-or-short-distance wireless transmission facility used in each home coordinate with each other. For implementing the above-described solution method, under a situation like this, it is also required that the two systems, which should be in a cooperation relationship, be caused to coexist with each other.

The present invention has been devised in view of the above-described problems. Namely, its object is to provide a technology for allowing a plurality of different white-spaces-utilized wireless communications systems to coexist with each other in a situation where, as described above, the IEEE802.22 WRAN and the IEEE802.11af WLAN exist in the mixed manner. In particular, its another object is to provide a technology for implementing the inter-systems-straddling multi-hop transmission or inter-systems coexistence, an example of which is such that the IEEE802.11af WLAN utilizes the IEEE802.22 WRAN as the backhaul line.

An aspect of the present invention is as follows: A network management unit included in a base station of the IEEE802.22 WRAN, and a heterogeneous-systems coexistence function unit included in a relay station perform communications by taking advantage of the wireless line of the IEEE802.22 WRAN. In this way, the network management unit and the heterogeneous-systems coexistence function unit make the determination and management of a frequency channel that is to be utilized by the IEEE802.11af WLAN. The determination and management of this frequency channel allows the IEEE802.22 WRAN and the IEEE802.11af WLAN to share and co-use this frequency, and to coexist with each other.

Also, a preferable aspect of the present invention is as follows: The QP (Quiet Period) of the IEEE802.22 WRAN and the QP of the IEEE802.11af WLAN are synchronized with each other with respect to the above-described frequency channel. Moreover, during the synchronized QPs, the IEEE802.22 WRAN and the IEEE802.11af WLAN make the absence confirmation of a primary user. The absence confirmation of the primary user prevents a secondary user from being falsely detected as the primary user.

Furthermore, when the IEEE802.22 WRAN and the IEEE802.11af WLAN share and co-use one and the same frequency in accordance with a time division scheme, the base station of the IEEE802.22 WRAN brings a frame-controlling signal into a non-transmission state, thereby bringing each terminal (i.e., CPE: Customer Premise Equipment) of the IEEE802.22 WRAN into a non-transmission state. In the meantime, the IEEE802.11af WLAN performs its communications. In addition, a notification for indicating a time-period, during which the IEEE802.22 WRAN is to perform its communications, is issued in advance, as the QP, to each IEEE802.11af WLAN terminal by the relay station. The issuing of this notification brings each IEEE802.11af WLAN terminal into a non-transmission state. In the meantime, the IEEE802.22 WRAN performs its communications.

The above-described methods allow implementation of the coexistence between the IEEE802.22 WRAN and the IEEE802.11af WLAN.

According to the present invention, it becomes possible to implement the mutual connection and coexistence between different-standards-based and white-spaces-utilized wireless communications systems.

Other objects, features, and advantages of the present invention will become apparent from the following description of embodiments of the present invention provided in relation to the accompanying drawings.

BRIEF DESCRIPTION OF THE DRAWINGS

FIG. 4 is a flowchart for illustrating a coexistence operation in a case where there exists a channel that is available to the IEEE802.11af WLAN only;

FIG. 5 is a flowchart for illustrating the coexistence operation in a case where different channels are respectively available to the IEEE802.22 WRAN and the IEEE802.11af WLAN; and FIG. 6 is a flowchart for illustrating the coexistence operation in a case where different channels are respectively unavailable to the IEEE802.22 WRAN and the IEEE802.11af WLAN.

DETAILED DESCRIPTION OF THE EMBODIMENT

Figure 1:
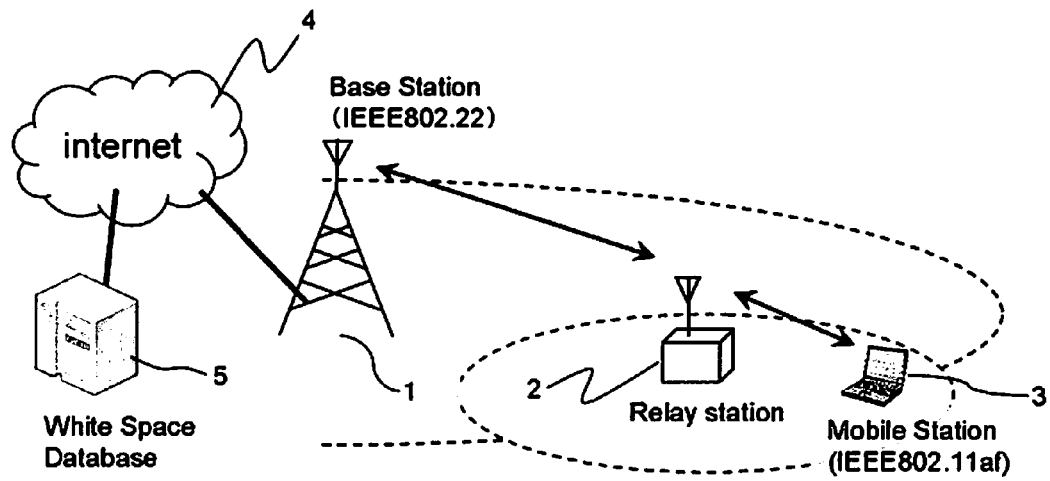
FIG. 1 is a configuration diagram for illustrating a white-spaces-utilized system according to an embodiment of the present invention.

Hereinafter, referring to the drawings, the explanation will be given below concerning embodiments of the present invention.

FIG. 1 is a configuration diagram for illustrating a white-spaces-utilized system according to an embodiment of the present invention. The white-spaces-utilized system according to the present embodiment includes a base station (BS) 1 for performing the management and control for an IEEE802.22 WRAN cell, a relay station (RS) 2, each terminal (MS, STA) 3, the Internet 4, and a white-space database (WSDB) 5. In the white-spaces-utilized system in the present embodiment, the relay station 2 relays communications performed between the base station 1 and each terminal 3, while communicating with the base station 1 via the IEEE802.22 WRAN, and communicating with each terminal 3 via the IEEE802.11af WLAN. The relay station 2, which implements the connection between the heterogeneous systems in this way, is also referred to as "a gateway".

Figure 2:
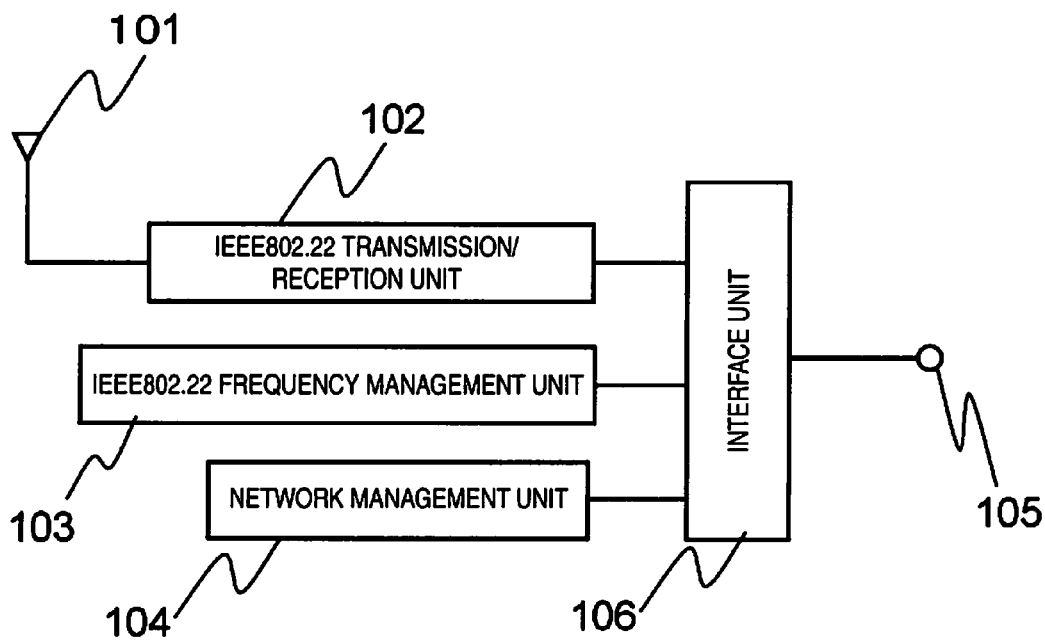
FIG. 2 is a block diagram for illustrating a base station 1 according to the embodiment of the present invention.

FIG. 2 is a block diagram for illustrating the base station 1. The base station 1 includes the following configuration components: An antenna 101, an IEEE802.22 transmission/reception unit 102 that is equipped with a transmission/reception function of the IEEE802.22-compliant base station, an IEEE802.22 frequency management unit 103, i.e., an IEEE802.22-compliant spectrum manager (SM), a network management unit 104 for controlling the utilization frequency channel, transmittable timing, and transmittable maximum power of the network (i.e., the IEEE802.11af WLAN) that is managed by the relay station 2 connected to the base station 1, a connection end-terminal 105 that is connected to the Internet, and an interface unit 106 that becomes an interface between the respective function units (102 to 104) and the connection end-terminal 105.

The IEEE802.22 frequency management unit 103 is a core-role function unit in the cognitive-radio base station. Concretely, the unit 103 maintains frequency information that is available as the IEEE802.22 WRAN, manages a list of operating channels and backup channels of its own and neighboring IEEE802.22 base stations, manages a QP's schedule, and implements the mutual coexistence function between the IEEE802.22 WRANs.

The network management unit 104 makes reference to and gives consideration to the IEEE802.22 available frequency information maintained by the IEEE802.22 frequency management unit 103, and manages the utilization frequency channel of the IEEE802.11af WLAN. In addition thereto, the network management unit 104 issues a notification to the IEEE802.22 frequency management unit 103, depending on the requirements. Here, this notification indicates the frequency channel allocated to the IEEE802.11af WLAN as interference information, or the frequency channel that has become an operating, preparatory, or candidate channel in its own or virtual IEEE802.22 base station.

Figure 3:
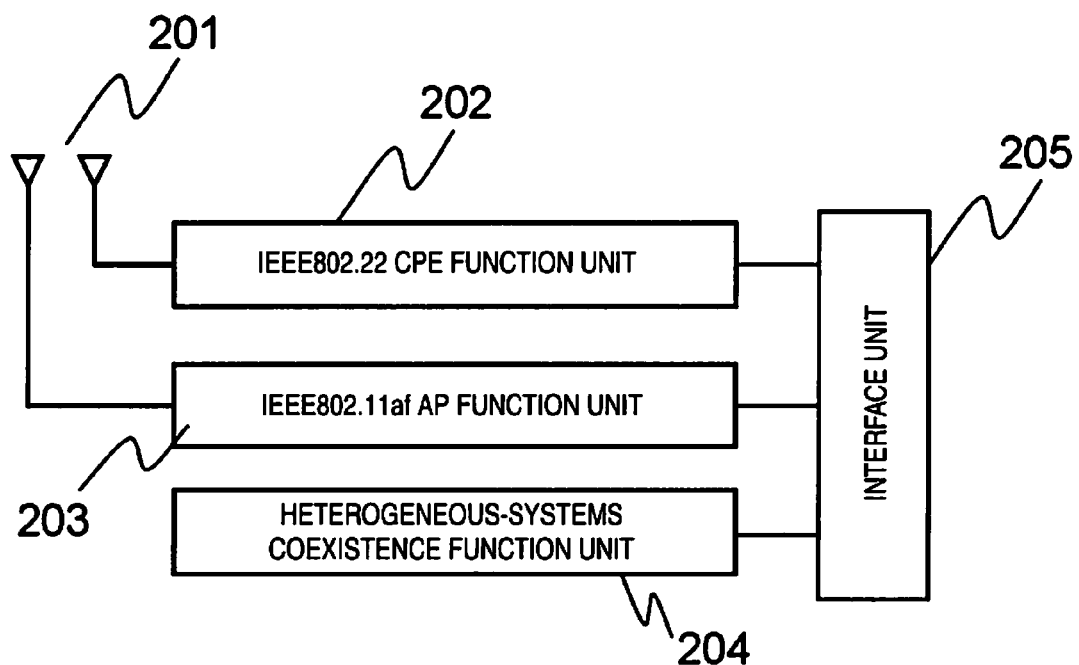
FIG. 3 is a block diagram for illustrating a relay station 2 according to the embodiment of the present invention.

FIG. 3 is a block diagram for illustrating the relay station 2. The relay station 2 includes the following configuration components: Antennas 201, an IEEE802.22 CPE function unit 202 that is equipped with an IEEE802.22-compliant terminal function, an IEEE802.11af AP function unit 203 that is equipped with an IEEE802.11af-compliant WLAN access-point function (including a routing function), a heterogeneous-systems coexistence function unit 204 that is equipped with a function of logging into the network management unit 104, and of requesting and acquiring a bandwidth (i.e., frequency channel), and an interface unit 205 that becomes an interface of the respective function units (202 to 204). This configuration allows the relay station 2 to perform its communications inside the IEEE802.11af WLAN, and to utilize the IEEE802.22 WRAN as the backhaul line.

Incidentally, the routing function, which is necessary when connecting different networks to each other, may also be provided into the function unit other than the IEEE802.11af AP function unit 203 (i.e., interface unit 205 or 106). The heterogeneous-systems coexistence function unit 204 acquires, by itself, information (i.e., address or the like) which is necessary for the connection to the network management unit 104, using SNMP (Simple Network Management Protocol) or the other publicly-known technologies (such as adjacent-party finding protocol).

Incidentally, in FIG. 3, the antennas 201 provide the different antennas to the IEEE802.22 CPE function unit 202 and the IEEE802.11af AP function unit 203, respectively. If, however, such parameters as the directionalities and gains may be the same, one antenna is allowed to be shared and co-used therebetween by using such devices as divider and synthesizer.

One feature in the present embodiment is as follows: Namely, the network management unit 104 included in the base station 1, and the heterogeneous-systems coexistence function unit 204 included in the relay station 2 perform communications by taking advantage of the wireless line of the IEEE802.22 WRAN. In this way, the unit 104 and the unit 204 make the determination and management of a frequency channel that is to be utilized by the IEEE802.11af WLAN. Also, another feature is as follows: Namely, in order to correctly make the detection of a primary user, the QP (Quiet Period) of the IEEE802.22 WRAN and that of the IEEE802.11af WLAN are synchronized with each other with respect to the above-described frequency channel.

Hereinafter, referring to FIG. 4, FIG. 5, and FIG. 6, the explanation will be given below concerning flows for the operation of the coexistence between the IEEE802.22 WRAN and the IEEE802.11af WLAN with respect to each of the following three cases: Namely, a case where there exists a channel that is available to the IEEE802.11af WLAN only (case 1), a case where there exist a plurality of different available channels, and where different channels are respectively available to the IEEE802.22 WRAN and the IEEE802.11af WLAN (case 2), and a case where there exists only one available channel, and where different channels are respectively unavailable to the IEEE802.22 WRAN and the IEEE802.11af WLAN (case 3). The frequency channels that are respectively available to the IEEE802.22 WRAN and the IEEE802.11af WLAN in the cases 1 and 2 are assumed as follows:

TABLE 1

|  | f1 | f2 | f3 | f4 |
|---|---|---|---|---|
| IEEE802.22 WRAN | ○ | ○ |  |  |
| IEEE802.11af WLAN/MAN | ○ | ○ |  | ○ |

○: channels that are available as white spaces

In this assumption, regarding the IEEE802.22 WRAN, the frequency channels f1 and f2 are available to the IEEE802.22 WRAN as the white spaces, but the frequency channels f3 and f4 are unavailable thereto because of interference protection for the primary users. Also, regarding the IEEE802.11af WLAN, the frequency channels f1, f2, and f4 are available to the IEEE802.11af WLAN as the white spaces, but the frequency channel f3 is unavailable thereto because of the interference protection for the primary users.

Here, the reason why the frequency channel f4 is available to the IEEE802.11af WLAN, but is unavailable to the IEEE802.22 WRAN is a difference in the transmission powers therebetween. Namely, the object of the IEEE802.11af WLAN is the intermediate-or-short-distance communications, and accordingly the IEEE802.11af WLAN is capable of performing its communications with less power as compared with the IEEE802.22 WRAN. Consequently, the IEEE802.11af WLAN is capable of performing its communications without causing significant interference to the primary users. No assumption, however, is made concerning a case opposite to the above-described assumption (i.e., a case where there exists a channel that is available to the IEEE802.22 WRAN only). If there should exist the channel that is available to the IEEE802.22 WRAN only, the IEEE802.22 WRAN is so qualified as to be able to use this channel in accordance with its standard.

Also, the white-space database (WSDB) 5 maintains information that is exactly the same as the above-described Table 1, or information that is capable of deriving the above-described Table 1. For example, the WSDB 5 is also allowed to be the following database: Namely, the availability/unavailability (i.e., presence or absence of the primary system) at each frequency channel, and the tolerably-transmittable maximum power in the available case are stored into this database on each frequency-channel basis. Moreover, the tolerably-transmittable maximum power is compared with the power that is at least needed in each system.

Incidentally, the following case is conceivable: Namely, the channel deployment in the IEEE802.11af WLAN is different from the one in the IEEE802.22 WRAN (or the primary system). For example, the channel spacing in the former network is equal to 4 MHz, but the one in the latter network is equal to 6 MHz. In this case, making a mention that different channels are respectively available to the IEEE802.22 WRAN and the IEEE802.11af WLAN means that there is no overlap between occupation bands of the channels of these networks. Also, making a mention that one and the same channel is available to the IEEE802.22 WRAN and the IEEE802.11af WLAN means that there is an overlap between the occupation bands of the channels of these networks.

[Case 1: The Case where there Exists a Channel that is Available to the IEEE802.11af WLAN Only]

Hereinafter, referring to FIG. 4, the explanation will be given below concerning details of the coexistence operation in the case where there exists a channel that is available to the IEEE802.11af WLAN only.

[S401]

First of all, in order to establish the backhaul line with the base station 1, the relay station 2 performs its network entry into the IEEE802.22 WRAN, using the IEEE802.22 CPE function unit 202.

In the present embodiment, the IEEE802.22 WRAN performs its communications using the frequency channel f1. The relay station 2 receives such messages as SCH (Superframe Control Header) and CBP (Coexistence Beacon Protocol), which are transmitted by the base station 1 using the frequency channel f1. By receiving these messages, the relay station 2 recognizes an operating channel and a backup channel which are used by the IEEE802.22 WRAN. These pieces of information recognized are memorized into the IEEE802.22 CPE function unit 202 and the heterogeneous-systems coexistence function unit 204.

In addition to its network entry into the IEEE802.22 WRAN, the relay station 2 issues, to the network management unit 104 of the base station 1, a notification to the effect that the relay station 2 is a relay device for the IEEE802.11af WLAN.

[S402]

After establishing the communications between the base station 1 and the relay station 2, the IEEE802.11af AP function unit 203 of the relay station 2 issues, to the heterogeneous-systems coexistence function unit 204, a command of trying to access the WSDB 5, and acquiring frequency channels that are available as the white spaces. This command is issued in order to acquire a list of the frequency-channels candidates that are available to the IEEE802.11af WLAN.

Having received this command, the heterogeneous-systems coexistence function unit 204 tries to access the WSDB 5, thereby acquiring the list of the frequency-channels candidates available to the IEEE802.11af WLAN, and memorizing the acquired list information therein.

In this way, in substitution for directly accessing the WSDB 5 by utilizing the wireless line of the IEEE802.22 WRAN, the IEEE802.11af AP function unit 203 tries to achieve the acquisition of the white-space information by taking advantage of the heterogeneous-systems coexistence function unit 204 as a gateway apparatus or proxy server.

Incidentally, the heterogeneous-systems coexistence function unit 204 may also take advantage of the network management unit 104 as a gateway apparatus or proxy server. Subsequently, the network management unit 104 may acquire the list of the frequency-channels candidates in substitution for the heterogeneous-systems coexistence function unit 204, and to notify the unit 204 of the acquired list. Accordingly, the network management unit 104 may also be set up inside the Internet 4 as a server or the like without being included inside the base station 1. By caching the white-space information about which the network management unit 104 has inquired of the IEEE802.22 frequency management unit 103 or the WSDB 5, the network management unit 104 makes it possible to reduce a load imposed on the WSDB 5.

[S403]

Having acquired the above-described IEEE802.11af-WLAN-available frequency-channels list, the heterogeneous-systems coexistence function unit 204 of the relay station 2 notifies the network management unit 104 of the base station 1 about the frequency-channels list that the unit 204 has acquired. The base station 1 returns a reception acknowledgement message to the relay station 2.

Incidentally, if, at the step S402, the heterogeneous-systems coexistence function unit 204 has caused the network management unit 104 to play a role of the gateway apparatus or proxy-server function, and to acquire the list in substitution for the heterogeneous-systems coexistence function unit 204, it is satisfying enough for the network management unit 104 to memorize the acquired list at that point-in-time. Consequently, the present step S403 is unnecessary.

[S404]

The heterogeneous-systems coexistence function unit 204 of the relay station 2 makes the comparison between an IEEE802.22-WRAN-available frequency-channels list and the IEEE802.11af-WLAN-available frequency-channels list. As a result of this comparison, if there exists a channel that is available to the IEEE802.11af WLAN only, and if this channel satisfies the system-specified communications quality, the heterogeneous-systems coexistence function unit 204 judges that this channel should be utilized. Moreover, the unit 204 issues, to the IEEE802.11af AP function unit 203, a notification to the effect that this channel will be utilized.

In the present embodiment, the frequency channel f4 is the channel that is available to the IEEE802.11af WLAN only, and accordingly the frequency channel f4 will be utilized. Having received, from the heterogeneous-systems coexistence function unit 204, the notification to the effect that the frequency channel f4 is available, and will be utilized, the IEEE802.11af AP function unit 203 sets and memorizes the cycle and period of the QP (Quiet Period) in order to periodically confirm the absence of a primary user. Furthermore, the unit 203 issues, to the heterogeneous-systems coexistence function unit 204, a notification to the effect that the cycle and period of the QP are set. It is desirable to set the cycle of the QP at an integral multiple of the wireless-frame cycle (i.e., 10 ms) or super-frame cycle (i.e., 160 ms) of the IEEE802.22 WRAN.

Incidentally, if there exists none of a channel that is available to the IEEE802.11af WLAN only, the frequency channel that should be utilized for the communications is determined in accordance with procedures illustrated in FIG. 5 and FIG. 6 (, the details of which will be described later).

[S405]

The heterogeneous-systems coexistence function unit 204 of the relay station 2 issues, to the network management unit 104 of the base station 1, a notification indicating the utilization determination of the frequency channel f4 and the QP-associated information. Having received this notification, the base station 1 returns a reception acknowledgement message to the relay station 2. The network management unit 104 notifies the IEEE802.22 frequency management unit 103 of the QP-associated information that the unit 104 has received.

The present step S405 makes it possible to cause the QP of the IEEE802.22 WRAN and the QP of the IEEE802.11af WLAN to be synchronized with each other with respect to the frequency channel f4. Namely, the IEEE802.22 frequency management unit 103 applies an out-bandwidth sensing to f4 during the QP period of f1. Here, the QP period of f1 is caused to coincide with the QP period of the IEEE802.11af WLAN. It is advisable that a QP period which has failed to coincide therewith is utilized for the sensing of the frequency channels other than f4. The execution of this out-bandwidth sensing makes it possible to prevent the IEEE802.22 WRAN from falsely detecting the IEEE802.11af WLAN as a primary user. As a result, the IEEE802.22 WRAN finds it possible to correctly confirm the absence of the primary user. Also, if the frequency-channels list of the WSDB 5 is updated, and if the IEEE802.22 WRAN finds it possible to utilize the frequency channel f4, the IEEE802.22 frequency management unit 103 applies the out-bandwidth sensing sufficiently to f4 with a timing at which the utilization of f4 by the IEEE802.11af WLAN is strongly assumed based on the QP timing. The execution of this sensing also makes it possible to prevent, with more certainty, the IEEE802.22 WRAN from failing to detect the existence of the IEEE802.11af WLAN, and causing the interference to occur to the IEEE802.11af WLAN.

Incidentally, the synchronization of the QP periods is not necessarily required to be performed with respect to the frequency channels other than the frequency channel f4. With respect to the frequency channel f1, the absence confirmation of the primary user is also allowed to be performed based on the QP that has been already set by the IEEE802.22 WRAN.

[S406]

In accordance with IEEE802.11af-specified procedures, the relay station 2 performs an authentication and a connection establishment with each terminal 3.

[S407]

In accordance with the IEEE802.11af-specified procedures, each terminal 3 memorizes the QP-associated information that each terminal 3 has acquired at the time of the connection establishment with the relay station 2.

[S408]

The relay station 2 performs its communications with the IEEE802.11af WLAN by utilizing the frequency channel f4. In parallel with the communications with the IEEE802.11af WLAN, the IEEE802.22 WRAN is capable of performing its communications by utilizing the frequency channel f1. As a result, these two systems find it possible to coexist with each other. Also, each terminal 3 of the IEEE802.11af WLAN is capable of establishing its connection with the Internet 4 via the base station 1 and the relay station 2.

[S409]

The relay station 2 confirms the absence of the primary user during the QP periods synchronized and determined at the step S405. If, however, the relay station 2 has detected the primary user, the relay station 2 prohibits the utilization of that channel as a protection channel.

If it is confirmed whether or not the frequency channel f4 is available to the IEEE802.22 WRAN as the white space, the QP periods with respect to the frequency channel f4 are synchronized with each other, then making the absence confirmation of the primary user.

If, hereinafter, a further bandwidth request occurs, the channel acquisition is performed by executing the steps S404 and S405. Also, even if the new bandwidth request is not occurred, it is allowable to execute the following operation: Namely, the notification at the step S405 is issued periodically, or every time the next QP schedule is determined. Moreover, the IEEE802.22 frequency management unit 103 eliminates, as being invalid, a QP which has elapsed by a predetermined time since the notification.

[Case 2: The Case where Different Channels are Respectively Available to the IEEE802.22 WRAN and the IEEE802.11af WLAN]

Hereinafter, referring to FIG. 5, the explanation will be given below concerning details of the coexistence operation in the case where different channels are respectively available to the IEEE802.22 WRAN and the IEEE802.11af WLAN, i.e., the case where there exist two or more channels that are available as the white spaces.

[S501 to S504]

The steps S501 to S504 are basically the same as the steps S401 to S404.

[S505]

At the step S504, if there exists none of a channel that is available to the IEEE802.11af WLAN only, the heterogeneous-systems coexistence function unit 204 of the relay station 2 sends a bandwidth request (i.e., channel-allocating request) to the network management unit 104 of the base station 1.

Channels that have been unused by the IEEE802.22 WRAN are made available to the IEEE802.11af WLAN without causing interference to occur. Accordingly, it is allowable to send the channel-allocating request by selecting and specifying an arbitrary channel out of these unused channels. Otherwise, it is also allowable to leave the allocation of a channel to the network management unit 104 with the channel unspecified.

[S506]

Having received the bandwidth request, the network management unit 104 of the base station 1 performs the following operations: Namely, if the allocation channel is specified, the network management unit 104 judges whether or not this allocation channel is available after taking into consideration such conditions as a possibility of causing interference to occur to another neighboring existing IEEE802.22 WRAN. Meanwhile, if the allocation channel is unspecified, the network management unit 104 selects an arbitrary allocation channel (it selects f2 in the present embodiment).

Moreover, after taking into consideration such conditions as the channel utilization situation of the neighboring IEEE802.22 WRAN, the network management unit 104 determines the transmittable timing (i.e., active frame), the QP, and (if necessary) the tolerably-transmittable maximum power on the allocation channel which will cause no interference to occur to the other system. At this time, if the IEEE802.22 WRAN is utilizing a plurality of channels, the network management unit 104 is also allowed to make a selection of opening the channels whose utilization is underway, and allocating the channels to the IEEE802.11af WLAN.

The QP determined is transmitted and set into the IEEE802.22 frequency management unit 103 (i.e., SM). This notification and setting makes it possible to prevent the IEEE802.22 WRAN system from performing the f2-utilized transmission when the IEEE802.11af WLAN system lies in its QP.

Furthermore, the BS 1 is also allowed to include, into the periodically-transmitted CBP, information indicating that f2 is an operating channel. This inclusion makes it possible to prevent the other IEEE802.22 WRAN from utilizing the frequency channel f2.

[S507]

The base station 1 notifies the relay station 2 of the determined allocation channel, transmittable timing, and QP.

When the allocation channel is specified at the time of the bandwidth request, and if the network management unit 104 judges that the specified allocation channel is unavailable, the unit 104 issues, to the relay station 2, a notification to the effect that there exists none of the allocation channel (i.e., allocation channel is unavailable). Having received this allocation result, the relay station 2 returns a reception acknowledgement message to the base station 1.

[S508]

Having received the allocation result, the IEEE802.22 CPE function unit 202 of the relay station 2 notifies the heterogeneous-systems coexistence function unit 204 and the IEEE802.11af AP function unit 203 about the allocation channel, the transmittable timing, and the QP, which are then memorized and set into these units. As described earlier, the transmittable timing and the QP are determined as a result of taking into consideration the channel utilization situation of the neighboring IEEE802.22 WRAN. This feature makes it possible to beforehand prevent occurrence of the interference with the neighboring IEEE802.22 WRAN, and further, to prevent occurrence of the false detection or false warning of a primary user during the QP.

[S509]

In accordance with the IEEE802.11af-specified procedures, the IEEE802.11af AP function unit 203 of the relay station 2 performs the authentication and the connection establishment with each terminal 3.

[S510]

In accordance with the IEEE802.11af-specified procedures, each terminal 3 memorizes the QP-associated information that each terminal 3 has acquired at the time of the connection establishment with the IEEE802.11af AP function unit 203.

[S511 to S512]

In the determined transmittable period and QP, the IEEE802.22 WRAN and the IEEE802.11af WLAN perform the communications and the absence confirmation of the primary system, respectively. In the present embodiment, the transmittable period and QP of the IEEE802.22 WRAN and those of the IEEE802.11af WLAN are synchronized with each other. This synchronization, however, is not absolutely necessary, since the frequencies utilized are different from each other.

[Case 3: The Case where Different Channels are Respectively Unavailable to the IEEE802.22 WRAN and the IEEE802.11af WLAN]

Hereinafter, referring to FIG. 6, the explanation will be given below concerning details of the coexistence operation in the case where different channels are respectively unavailable to the IEEE802.22 WRAN and the IEEE802.11af WLAN. One assumed example of this case is as follows: Namely, there exists only one channel that is available as the white space, and the frequency channel f1 is this only one available channel. In the present embodiment, in the case where there exists only one available channel, this channel is shared and co-used based on a time division scheme. Moreover, each system utilizes this channel in accordance with the IEEE802.22-specified frame unit.

[S601 to S605]

The steps S601 to S605 are basically the same as the steps S501 to S505.

[S606]

Having received the bandwidth request, the network management unit 104 of the base station 1 performs the following operation: Namely, in order to implement the time-division-scheme-based sharing and co-use of the frequency channel f1 with the IEEE802.11af WLAN, the network management unit 104 determines the transmittable timing (i.e., frame), and the cycle and period of the QP of the IEEE802.11af WLAN. These pieces of information determined are transmitted to the IEEE802.22 frequency management unit 103. Incidentally, in the ordinary SCH or CBP, information is added to the IEEE802.22-WRAN-used frame as an active frame. In the present invention, information is also added to the IEEE802.11af-WLAN-used frame as the active frame without being distinguished from the IEEE802.22-WRAN-used frame. This feature makes it possible to prevent the IEEE802.11af-WLAN-allocated frame from being used by the neighboring IEEE802.22 WRAN.

[S607 to S610]

The steps S607 to S610 are basically the same as the steps S507 to S510. The one and the same channel, however, can be shared and co-used by a plurality of relay stations 2. At this time, the allocation channel, transmittable timing, and QP, of which the respective relay stations 2 are notified at the step S607, are common to these relay stations 2.

Also, in general, each terminal 3 does not make the absence confirmation (i.e., sensing) of a primary user. Accordingly, even if all of the frames other than the IEEE802.11af-WLAN-transmittable frame are transmitted and set as QPs, the primary user will not be falsely detected. Consequently, the period corresponding thereto is set as the QP (which is allowable as long as it is a transmission-prohibited period).

[S611]

During the transmittable period allocated thereto, the IEEE802.11af WLAN (i.e., the IEEE802.11af AP function unit 203 and each terminal 3) performs its communications by utilizing the frequency channel f1.

Meanwhile, the IEEE802.22 WRAN is on its stand-by in a non-transmission state. Incidentally, the base station 1 transmits the present frame as the active frame of the base station 1 by using the SCH or CBP. As a result, each CPE of the IEEE802.22 WRAN recognizes that the frame of the IEEE802.22 WRAN is being transmitted thereto. Actually, however, the transmissions of frame control information, such as frame preamble, FCH (Frame Control Header), DSMAP, and USMAP, are not performed from the base station 1. On account of this situation, in the present frame, each CPE performs no transmission, thus causing no interference to occur to the IEEE802.11af WLAN.

[S612]

During the transmittable period allocated thereto, the IEEE802.22 WRAN performs its communications by utilizing the frequency channel f1.

Meanwhile, the IEEE802.11af WLAN (i.e., the IEEE802.11af AP function unit 203 and each terminal 3) is on its stand-by in a non-transmission state.

The non-transmission state can be implemented using the respective types of publicly-known methods. For example, when the PCF (Point Coordination Function) is utilized as the access scheme, the non-transmission state can be implemented as follows: Namely, the IEEE802.22 WRAN sets the CFP (Contention Free Period) in a manner of being caused to coincide with the active period, then performing its notification using a parameter included into the beacon or Probe Response. Simultaneously, during the CFP, the IEEE802.22 WRAN gives no access right to all of the terminals 3 (i.e., does not transmit the CF-Poll).

[S613]

The IEEE802.22 WRAN and the IEEE802.11af WLAN fall into the non-transmission states, then making the absence confirmation of the primary user.

Incidentally, if the spectrum sensing is not absolutely necessary for the IEEE802.11af WLAN (for the reason that the utilization frequency has been confirmed to the WSDB 5), the QP of the IEEE802.11af WLAN at the present step is allowed to be a mere and simple non-transmission period. Moreover, the QP of the IEEE802.22 WRAN is classified into the following two types: A short-period and short-cycle QP used for "Intra-frame sensing", and a long-period and long-cycle QP used for "Inter-frame sensing". When the QP is the short-period QP, the IEEE802.11af WLAN gives a communications' advance notice in accordance with the RTS/CTS steps, but performs no communications actually. This process makes it possible to implement the non-transmission state during the period.

As having been explained so far, the use of the relay station as explained in the preset embodiment allows implementation of the coexistence between the IEEE802.22 WRAN and the IEEE802.11af WLAN.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A heterogeneous-systems coexistence method for allowing a first wireless system and a second wireless system to coexist with each other, wherein communications schemes of the first and second wireless systems utilize white spaces and are different from each other, the heterogeneous-systems coexistence method comprising the steps of:

acquiring, by a heterogeneous-systems coexistence unit, information about frequency channels via a terminal unit of the first wireless system, wherein the information is acquired by utilizing a communications path established under the first wireless system, the frequency channels acquired are available to a base station of the second wireless system, and the base station of the second wireless system includes the heterogeneous-systems coexistence unit;

starting, by the base station of the second wireless system, communications by utilizing a subject frequency channel, wherein the subject frequency channel is identified from among the frequency channels provided in the information acquired by the heterogeneous-systems coexistence unit;

receiving and storing, by a network management unit, information regarding the subject frequency channel actually utilized by the base station of the second wireless system from the heterogeneous-systems coexistence function unit of the second wireless system, wherein a base station of the first wireless system includes the network management unit;

storing, by the network management unit of the first wireless system, information regarding a quiet period being set on the subject frequency channel utilized by the base station of the second wireless system; and making, by the base station of the first wireless system, a presence confirmation of a wireless-frequency utilization made by a system other than the first and second wireless systems when a frequency channel utilized by the base station of the first wireless system is different than the subject frequency channel utilized by the second wireless system as indicated in the information stored by the network management unit, wherein the presence confirmation is made via the subject frequency channel utilized by the second wireless system and is made in synchronization with the quiet period of the second wireless system.

2. The heterogeneous-systems coexistence method according to claim 1, wherein each of the first and second wireless systems is a system whose quiet period can be set, the heterogeneous-systems coexistence method, further comprising the steps of:

identifying, by the heterogeneous-systems coexistence unit, a desired frequency channel that is available for the second wireless system and not available for the first wireless system;

determining, by the heterogeneous-systems coexistence unit, whether the desired frequency channel identified should be utilized as the subject frequency channel;

notifying, by the heterogeneous-systems coexistence unit, the network management unit of the first wireless system of the desired frequency channel identified; and applying, by the base station of the second wireless systems, an out-bandwidth sensing on the desired frequency channel during the quiet period of the frequency channel utilized by the first wireless system, wherein the quiet period of the frequency channel utilized by the first wireless system is synchronized with the quiet period of the desired frequency channel utilized by the second wireless system.

3. The heterogeneous-systems coexistence method according to claim 2, further comprising the steps of:

making, by the network management unit, reference to information about frequency channels that are available for the first wireless system, and judging that there exists none of an empty frequency channel that can be allocated to the second wireless system;

bringing, by the base station of the first wireless system, each terminal of the first wireless system into a non-transmission state by not transmitting a frame-controlling signal in order to set the quiet period of the first wireless system;

issuing, by the base station of the second wireless system, in advance, to each terminal of the second wireless system, a notification for indicating the quiet period of the second wireless system chosen so as to differ from the quiet period of the first wireless system; and performing, by the base station of the second wireless system, communications with each terminal of the second wireless system during the quiet period of the first wireless system, wherein the first and second wireless systems share and co-use one same frequency in accordance with a time division scheme.

4. A wireless gateway apparatus for relaying communications that are performed by utilizing frequencies of white spaces by each of a first wireless system and a second wireless system, communications schemes of the first and second wireless systems being different from each other, the wireless gateway apparatus relays communications between the first and second wireless systems by utilizing the first wireless system as a backhaul to connect the second wireless system with internet, the wireless gateway apparatus, comprising:

a first-system terminal performing wireless communications with a base station of the first wireless system as terminal of the first wireless system;

a second-system access point unit performing wireless communications with each terminal of the second wireless system as a base station of the second wireless system; and a heterogeneous-systems coexistence function unit controlling the second-system access-point unit such that the second-system access point unit communicates via a subject frequency channel, wherein the heterogeneous-systems coexistence function unit acquires a list of frequency channels available to the second wireless system from an external database and logs into the base station of the first wireless system to request an assigned frequency channel, when a transmittable timing is limited on the subject frequency channel, the heterogeneous-systems coexistence function unit sets the second-system access point unit as to bring the second wireless system into a quiet period during a whole period other than the transmittable timing, when a frequency channel that is unavailable to the first wireless system is found within the list, the heterogeneous-systems coexistence function unit has the second-system access point unit use the frequency channel that is unavailable as the subject frequency channel and notifies the base station of the first wireless system, via the first-system terminal, of the subject frequency channel and the quiet period to be used by the second-system access point unit on the subject frequency channel, and when all of the frequency channels provided in the list are indicated as being available to the first wireless system, the heterogeneous-systems coexistence function unit has the second-system access point unit use the assigned frequency channel acquired from the first wireless system as the subject frequency channel and the quiet period of the second wireless system is synchronized with a quiet period of the first wireless system.

5. A base-station apparatus of a first wireless system for providing a backhaul line to a gateway apparatus for relaying communications between the first wireless system and a second wireless system, the first and second wireless systems being so designed as to utilize white spaces, and communications schemes of the first and second wireless systems being different from each other, the base-station apparatus, comprising:

a transceiver equipped with a wireless transmission-reception function of a base station of the first wireless system;

a frequency management unit using the transmission-reception function of the transceiver as a spectrum manager of the first wireless system, and making presence confirmation of a system other than the first wireless system; and a network management unit communicating with the gateway apparatus, wherein the network management unit receives a predetermined inquiry from the gateway apparatus, the network management unit references information regarding frequency channels that are available for the first wireless system and determines whether there exists a given frequency channel that is not being utilized and which can be allocated to the second wireless system, the network management unit issues, to the gateway apparatus, a notification that indicates an assigned frequency channel that should be utilized by the gateway apparatus of the second wireless system, the assigned frequency channel is the given frequency channel that is not being utilized by the first wireless system, the network management unit collects and manages information about utilization frequency channel and transmittable period or quiet period of the second wireless system managed by the gateway apparatus in reference to information maintained by the frequency management unit, and when a frequency channel utilized by the first wireless system is different from the frequency channel utilized by the second wireless system which is stored by the network management unit, the network management unit makes the presence confirmation in synchronization with the quiet period of the second wireless system on the frequency channel utilized by the second wireless system.

6. The base-station apparatus of claim 5 wherein the network management unit periodically transmits information indicating the subject frequency channel being utilized by the second wireless system is an operating channel, and transmits the information via the transceiver.

7. The base-station apparatus of claim 6 wherein:

the network management unit makes reference to and gives consideration to available frequency information for the first wireless system which is maintained by the frequency management unit, and the network management unit manages a frequency channel utilized by the second wireless system and issues a notification to the frequency management unit, the notification issued indicates the frequency channel utilized by the second wireless system as interference information, or the frequency channel that has become an operating, preparatory, or candidate channel for the first wireless system.

8. The wireless gateway apparatus of claim 4 wherein the heterogeneous-systems coexistence function unit notifies the first wireless system via the first-system terminal that the wireless gateway apparatus is a relay device.

* * * * *